3,553,152
AQUEOUS COATING COMPOSITION
Robert W. Kershaw, Frederick J. Lubbock, and Livia Polgar, Melbourne, Victoria, Australia, assignors to Balm Paints Limited, Victoria, Australia, a corporation of Australia
No Drawing. Filed Oct. 2, 1967, Ser. No. 672,024
Claims priority, application Australia, Oct. 18, 1966, 12,665
Int. Cl. C08f 45/24
U.S. Cl. 260—29.6                9 Claims

ABSTRACT OF THE DISCLOSURE

A coating composition consisting of an aqueous latex comprising 20 to 60% by weight of disperse resinous particles of average particle diameter 0.01 to 3.0 micron in combination with, as a thickening agent, from 0.1% to 10.0% by weight of a partial ether of poly(vinyl alcohol) in which from 1% to 50% of the hydroxyl groups of the poly(vinyl alcohol) are etherified, the degree of etherification in the preferred embodiment being related to the number of carbon atoms in the etherifying alcohol.

---

This invention relates to coating compositions in which the important constituents are aqueous latexes and thickeners, for example latex house paints. By latex paints we means those paints which are characterised in that a resinous binder is dispersed or emulsified in an aqueous phase, commonly referred to as the continuous phase.

Such latex paints are usually characterised by poor flow properties in comparison with solvent-borne alkyd paints. Attempts to improve these flow properties by using large particle latices have resulted in lower gloss, and attempts at improvement by incorporating therein relatively large amounts of slow evaporating organic liquids have resulted in slower drying.

We now provide latex coating compositions with improved flow properties when compared with conventional latex paints, characterised by having low yield values and high plastic viscosities, which impart to the coating compositions excellent application properties and good levelling without impairing the gloss and fast drying properties of the compositions. By levelling we mean the process of attaining a smooth film in which the imperfections left by brush or roller application disappear during the drying process. By yield value and plastic viscosity we mean the values calculated from the intercept on the abscissa and the slope respectively, of a graph of the shear rate/shear stress curve plotted on a square root co-ordinate graph. The extrapolation of the graph should be made from the results in the high shear region as is accepted practice. This graph is derived from measurements made on a suitable rheometer or viscometer in which the shear stress and its corresponding shear rate may be measured at small increments or continuously over a wide range.

This graph, which is sometimes called a Casson plot, is illustrated for example, by Asbeck, in the Official Digest of the Federation of Societies for Paint Technology 33 (1961) on page 69.

We have found that levelling characteristics are conveniently described by the ratio of plastic viscosity in centipoises divided by the yield value in dyne/cm². This ratio we will call the "Flow Coefficient." We have found that, while conventional latex paints have Flow Coefficients below 2.0, it is possible to produce latex paints having Flow Coefficients above 3.0, indicating much better levelling characteristics, by adding to a latex vehicle a thickening agent selected from particular derivatives of poly(vinyl alcohol).

The plastic viscosity of our coating compositions is not, in itself, critical, and we have found it possible to vary it from 5 centipoises to 500 centipoises. Our preferred range for application is from 50 to 300 centipoises. Conventional latex paints, on the other hand, are usually limited to plastic viscosities below 100 centipoises because of the poor levelling characteristics caused by their higher yield values.

It is possible to formulate latex coating compositions with improved flow properties when compared to those in present commercial use, by employing as the thickening agent particular derivatives of poly(vinyl alcohol). One of these classes of derivatives, the acetals, is described in our copending U.S. application of Kershaw et al., Ser. No. 631,140, filed Apr. 17, 1967. Another of these classes of derivatives, the poly vinyl alcohol/ethers is described below.

The present invention accordingly provides a composition comprising in combination:

(a) A latex vehicle comprising water, 0 to 30% by weight of water miscible organic liquids, 0 to 4% by weight of surface active agents, and 20 to 60% by weight of dispersed resinous particles having an average particle size between 0.01 micron and 3.0 microns, preferably between 0.1 micron and 1.0 micron, based on the total weight of liquid latex vehicle; and (b) from 0.1% to 10.0% by weight, preferably between 0.5% and 5.0% by weight, based on the weight of resinous particles, of a thickening agent soluble in the continuous phase of the latex and selected from poly(vinyl alcohol) derivatives having a molecular weight between 10,000 and 600,000 preferably between 20,000 and 200,000, from 1% and 50% of the hydroxyl groups of the poly(vinyl alcohol) being substituted by ether groups of the formula —OR each of the ether groups replacing a hydroxyl group, and where R, which may be the same or different within the molecule, contains 2 to 10 carbon atoms, and is selected from the group consisting of alkyl, alkenyl, alkoxy-alkyl, alkoxy-alkenyl, aryl, alk-aryl, ar-alkyl, ar-alkoxyl groups and derivatives of any of the above groups in which at least one hydrogen atom has been replaced by a chlorine atom.

Examples of preferred groups are: ethyl, n-propyl, iso-propyl, n-butyl, iso-butyl, secondary-butyl, tertiary-butyl, 2-chloro-ethyl, 2-methoxy-ethanol, cyclohexyl and benzyl groups.

The most preferred representatives are those in which R is butyl or propyl, that is our most preferred thickeners are partial butyl ethers, or partial propyl ethers of poly (vinyl alcohol).

The thickening agent is chosen from within the quoted compositions so that it remains soluble at the temperature at which the paint is made and at the desired concentration by soluble we mean that a homogeneous solution results, that is micellar solutions are included; even hazy solutions in which the micelles are large enough to interact with light are considered in this invention to be homogenous.

The maximum practical level of substitution of hydroxyl groups by ether groups in the thickener molecule is dependent upon the nature of the aqueous phase of the composition. For example, it will be understood by those skilled in the art that the pressure therein of organic liquids and/or surface active agents may permit thickeners having higher levels of substitution by ether groups to remain in solution than would remain in solution in water alone.

The upper limit of the substitution of hydroxyls in the thickener composition for each chosen system of organic liquid, water and thickener, is thus easily determined by experiment by merely checking the solubility of the thickener in the continuous phase at the temperature and thickener concentration at which the paint is made.

The lower level of substitution chosen is primarily an economic decision in which the effect on flow characteristics of increasing the number of ether groups in a thickener molecule is balanced against the increased cost of so modifying the thickener. In general we prefer to replace at least 1% by weight of the hydroxy groups of the poly(vinyl alcohol) by ether groups.

The desired level of substitution of poly(vinyl alcohol) depends upon the chain length of the substituent. By the chain length of the substituent we mean the total number of carbon atoms covalently linked carbon to carbon in the substituent. Because the chains so-formed are not necessarily linear, for example they may be branched chains, e.g. on iso-alkyl group, it is more convenient to identify the chains by the total number of carbon atoms forming them. Furthermore as R may be the same or different at each substitution point within the one molecule, in determining the desired level of substitution an arithmetic average value of the number of carbon atoms, based on the relative molar proportions of substituents selected, is used in calculating the desired level of substitution. For example in the following derivatives the degree of substitution expressed as a percentage of the total hydroxyl groups is:

PERCENTAGE OF TOTAL HYDROXYL GROUPS REPLACED

| Number of carbon atoms in R | Percent substitution | | |
|---|---|---|---|
| | Lower limit | Upper limit | Preferred range |
| 2 | 10 | 50 | 15-30 |
| 3 | 6 | 30 | 8-20 |
| 4 | 3 | 20 | 5-10 |
| 6-7 | 1 | 15 | 2-8 |

Our thickeners are made by conventional organic chemical techniques. For example they may be prepared by copolymerising a vinyl ether monomer or mixture of monomers with a vinyl ester monomer, using the well known methods of solution, bead, aqueous emulsion or non-aqueous emulsion polymerization. The ester groups are subsequently chemically removed.

Alternatively, our thickeners may be prepared by a Williamson synthesis in which sodium poly(vinyl alkoxide) is reacted with the appropriate halogen derivative, or they may be prepared by dehydrating a mixture of poly (vinyl alcohol) and the appropriate alcohol.

Preferably, copolymerisation in an aqueous emulsion is used, wherein conventional anionic surfactants or nonionic surfactants and protective colloids can be used, all this being well known in the art.

The composition of the resinous particles of the latex vehicle is not critical and we have found that our invention is applicable to all of the polymers or copolymers used in conventional latex paints. Such polymers are homopolymers or copolymers of the following classes of monomers:

Vinyl esters
Vinyl ethers
Alkyl acrylates
Alkyl methacrylates
Alkyl fumarates and maleates
Halogenated vinyls
Aryl vinyls
Olefins For example suitable monomers are vinyl acetate, vinyl propionate, vinyl caprate, vinyl stearate, vinyl "Versatate" (registered trademark of Shell Chemicals), vinyl siloxane, and the saturated monohydric alcohol esters of acrylic acid, methacrylic acid, maleic acid and fumaric acid including those derived from methanol, ethanol, n-propanol, isopropanol, n-butanol, isobutanol, secondary butanol, tertiary butanol, cyclohexanol, 2 ethylhexanol, dodecanol, hexadecanol, and octadecanol. Other suitable monomers include vinyl chloride, vinylidene chloride, vinylidene fluoride, styrene, vinyl toluene, ethylene, propylene, iso-butylene. The resinous particles may be essentially linear polymers or copolymers of isoprene, chloroprene and butadiene.

Preferred members of these classes are copolymers of vinyl acetate in the major molar proportion with vinyl caprate. 2-ethyl hexyl acrylate, ethyl acrylate, n-butyl methacrylate, di-butyl maleate, or di-butyl fumarate in the minor molar proportion, or copolymers of methyl methacrylate with ethyl acrylate, butyl acrylate, butyl methacrylate, or 2-ethyl hexyl acrylate.

It is known that minor (usually less than 3% by weight of the resin) proportions of other monomers are sometimes used to further modify the above copolymers and we include such modifications in our definition of suitable copolymers.

The continuous phase comprises water as the suspending medium, into which may be introduced organic liquids, either with the latex itself or separately. These organic liquids adjust viscosity, control evaporative properties and provide freeze-thaw stability, according to the purpose to which the composition is to be applied.

By organic liquids we mean all water soluble or water miscible organic liquids, particularly those which are conventionally used in latex paints to control evaporation properties. Up to 30% by weight may be present in the continuous phase.

The preferred types of organic liquids are alkyl alcohols, alkylene glycols, alkyl glycol ether alcohols, alkyl ketones and some alkyl ethers. We have found ethyl alcohol, propyl alcohol, ethylene glycol, propylene glycols, butylene glycols, hexylene glycols, diethylene glycol, 2-methoxy ethanol, 2-ethoxy ethanol, 2-propoxy ethanol, 2-butoxy ethanol, diethylene glycol monomethyl ether, diethylene glycol monoethyl ether, diethylene glycol mono-propyl ether, diacetone alcohol, and dioxane to be satisfactory solvents.

The more preferred organic liquids are: ethylene glycol, propylene glycols, butylene glycols, 2-ethoxy ethanol, 2-butoxy ethanol and diacetone alcohol.

The continuous phase may also comprise surface-active agents which are commonly encountered in latex paint formulations. Such agents may be components utilised in manufacturing the latex or introduced into the composition for example to stabilise dispersed pigment or polymer particles or to assist the paint to wet greasy surfaces.

We limit the concentration of such surface-active agents to a maximum of 4% by weight of the continuous phase.

A wide variety of surface-active agents, including both anionic and non-ionic types, either singly or in combination, are in common use for such purposes.

We have found that certain compositions which contain a relatively high proportion of anionic surface-active agents exhibit their most favourable flow characteristics at a pH range characteristic of that composition. In optimising the performance of a given formulation we therefore measure the flow coefficient of the composition on samples adjusted to a range of pH values and select from these the most suitable pH for the latex paint. For example, an ammonia-containing latex is conveniently adjusted to a lower pH by the addition thereto of aqueous formaldehyde solution.

A latex paint contains a variety of ingredients other than the latex and thickener, each of which contributes desired properties to the paint.

Most latex paint recipes include the majority of the following additional types of ingredients, the examples named being ingredients which we have found to be satisfactory in the invention.

| Ingredient | Purpose | For example— |
|---|---|---|
| Pigment | Opacity, colour, durability | Titanium dioxide, phthalocyanine blue. |
| Fillers or extenders | Lower cost, lower gloss, control of application, film stabilizer | Whiting, talc, barytes, china clay. |
| Dispersant | Pigment wetting and dispersion | Sodium hexametaphosphate. Alkali metal polyphosphates or silicates. |
| Plasticiser | To flexibilise the film former | Di-butyl phthalate tri-butyl phosphate. |
| Defoamer | Foam prevention in manufacture and application | A fatty acid/glycerol ester. |
| Preservatives | To prevent mould growth in the paint and on the paint film | Penta-chlor phenol. Organomercurals. |
| Perfume | Re-odorant | "Bay Rum". |

The selection of these remaining ingredients is limited by the requirement that all of the ingredients must be mutually compatible. That is the selected ingredients must be inert with respect to the latex and thickener. For example certain pigments such as lead chromate are not used in latex paints because of high water soluble material content, and unconventional materials like this should be avoided. Other materials which are known to react with poly(vinyl alcohol), or which are likely to adversely interact with the latex/thickener combination, such as boric acid and borate ions, are undesirable. Both of these variations can result in obvious incompatibility and gelation of the paint.

Less obvious, but still deleterious to our invention, is a decrease in flow coefficient of the latex paint caused by unsuitable choice of additives of which lecithins are examples.

Because of the large numbers and varieties of materials which can be utilised in latex paint manufacture it is not feasible to specify all such unsuitable additives.

In practice we test the suitability of a particular additive by adding it in the required concentration to the selected combination of latex and thickener and measure the flow coefficient of the mixture. If the flow coefficient so-determined falls below the level specified for the particular latex paint, the additive is rejected as unsuitable.

The flow characteristics of our compositions are degraded by the addition of conventional thickeners. For some special purposes it may be desirable to degrade the flow characteristics of a latex paint prepared according to our invention and this may be conveniently achieved by adding to the said paint a conventional thickener in such proportions as to give the required flow characteristics.

A pigmented latex paint is conveniently prepared by dispersing or grinding the pigments and fillers with the dispersant, thickener, defoamer and water in a ball mill, or sand mill, or colloid mill, or sigma bladed mixer, or impeller mixer to provide a mill-base. When satisfactorily dispersed this mill-base should be added and stirred into the latex and other ingredients which have been previously mixed together.

The invention is illustrated by Examples 1–4 and 6–28 in which all parts are given by weight. Conventional "control" paints are illustrated for comparison in Examples 5 and 29, in which all parts are also given by weight.

EXAMPLE 1

Preparation of a poly(vinyl n-butyl ether/vinyl alcohol) thickener by firstly preparing a vinyl acetate/vinyl n-butyl ether copolymer emulsion in water and then hydrolysing the acetate groups to hydroxyl groups.

A solution of 0.125 part of "Cellosize" WP 4400 (a registered trademark of Union Carbide Corporation for a hydroxy ethyl cellulose polymer), 0.125 part of "Cellosize" WP 09 (a registered trademark of Union Carbide Corporation for a hydroxy ethyl cellulose polymer), and 6.2 parts of "Abex" 26-S (a registered trademark of Unibasic Incorporated for a surfactant) in 42.9 parts of water was placed in a flask fitted with a reflux condenser, stirrer, thermometer and separating funnel. The temperature was raised to 70° C., and 0.10 part of sodium bicarbonate and 0.05 part of potassium persulphate were added. While maintaining the temperature at 70 to 75° C., 42.8 parts of vinyl acetate and 6.7 parts of vinyl n-butyl ether were added from the separating funnel over a period of three hours. When 50% of the monomers had been added, 0.25 part of a 5% solution of potassium persulphate in water was added and similar additions were made after 70%, 90% and 100% of the monomers had been added. A fine particle size latex was obtained. A solution of 20.4 parts of sodium hydroxide in 50 parts of water and 50 parts of ethanol was prepared, and added to the latex. After refluxing for a further three hours, a brown solution was obtained. The polymer in this solution was precipitated in an excess of hot water, and dissolved in cold water to give a viscous solution containing 21.7% solids. This solution will be referred to as Thickener I. The infrared spectrum of the polymer showed that complete hydrolysis of the acetate groups had occurred.

EXAMPLE 2

Preparation of a poly(vinyl alcohol/vinyl n-butyl ether) thickener.

A solution of 0.125 part of "Cellosize" WP 4400, 0.125 part of "Cellosize" WP 09, and 6.2 "Abex" 26-S, in 42.9 parts of water was placed in a flask fitted with a reflux condenser, stirrer, thermometer and separating funnel. The temperature was raised to 70° C., and 0.10 part of sodium bicarbonate and 0.05 part of potassium persulphate were added. While maintaining the temperature at 70 to 75° C., 46.1 parts of vinyl acetate and 3.4 parts of vinyl n-butyl ether were added from the separating funnel over a period of three hours. When 50% of the monomers had been added, 0.25 part of a 5% solution of potassium persulphate in water was added, and similar additions were made after 70%, 90%, and 100% of the monomers had been added. A fine particle size latex was obtained. A solution of 20.4 parts of sodium hydroxide in 50 parts of water and 50 parts of ethanol was prepared, and added to the latex. After refluxing for a further three hours, a brown solution was obtained. The polymer in this solution was precipitated in an excess of hot water, and dissolved in cold water to give a viscous solution containing 20% solids. This solution will be referred to as Thickener II. The infra red spectrum of the polymer showed that complete hydrolysis of the acetate groups had occurred.

EXAMPLES 3 AND 4

Preparation of thickened aqueous latex paints utilising Thickeners I and II from Examples 1 and 2.

The composition of both of the latex paints in these examples is summarised in Table 1. In both cases the paint was prepared by first mixing a mill base consisting of 10 parts of "Austiox" R–CR3 (a registered trademark of Australian Titan Products Pty. Ltd. for a titanium dioxide pigment), 0.1 part of "Nopco" NXZ (a registered trademark of Nopco Chemical Company for an antifoaming agent), 0.3 part of a 25% (w./v.) solution of sodium hexametaphosphate, and the required amounts, given in Table 1, of water and thickener solution to give satisfactory viscosities both in the mill base and in the final paint. The particular thickener solution used in each of Examples 3 and 4 is given in Table 1. Each mill base was ground in a laboratory "sand" mill for thirty minutes, using about 5 parts of sand.

After reducing the stirring speed, 27 parts of a latex was added to each mill base. This proportion refers to the total amount of added latex as obtained from the manufacturer, together with any plasticiser added to the latex prior to the preparation of the paint. As can be seen from Table 1, the latex used in Examples 3 and 4 was "Primal" AC61 (a registered trademark of Primal Chemicals Pty. Ltd. for an acrylic latex) plasticised with 5% (based on the latex solids) of tributylphosphate.

TABLE 1

|  | Example No. | |
| --- | --- | --- |
|  | 3 | 4 |
| Thickener solution used (from Examples 1 and 2) | I | II |
| Composition: | | |
| "Austiox" R–CR3 (registered trademark of Australian Titan Products for a rutile titania pigment) | 10.0 | 10.0 |
| "Nopco" NXZ (Registered Trademark of Nopco Chemical Company for a defoamer) | 0.1 | 0.1 |
| Sodium hexametaphosphate 25% solution | 0.3 | 0.3 |
| Distilled water | 13.0 | 8.0 |
| Thickener I | 5.0 | |
| Thickener II | | 4.0 |
| Latex, plasticised ("Primal" AC–61*, 97.5 parts; Tributyl phosphate, 2.5 parts) | 27.0 | 27.0 |
| Properties: | | |
| Gloss at 60° of dried film of paint | 75 | 75 |
| Plastic viscosity (poise, 25° C.) | 3.2 | 2.3 |
| Flow coefficient | 9.4 | 5.2 |
| Yield value (dynes/cm.²) | 34 | 44 |

*"Primal" is a registered trademark of Rohm and Haas Company for an acrylic latex.

These two latex paints both exhibited good flow characteristics and gloss on application when compared with conventional latex paints.

EXAMPLE 5

This example illustrates for comparison the preparation of a conventional aqueous latex paint incorporating an acrylic latex of small particle size and a cellulosic thickener. The latex paint had good gloss, but very poor flow characteristics.

The paint was prepared by the method used in Examples 3 and 4. The mill base consisted of 10 parts of "Austiox" R–CR3, 0.1 part of "Nopco" NXZ, 0.3 part of 25% (w./v.) sodium hexametaphosphate solution, 0.12 part of "Natrosol" 250 HR (a registered trade mark of Hercules Powder Company for a hydroxyethyl cellulose), and 4.5 parts of distilled water. Twenty-eight parts of "Primal" AC61 and 0.7 part of tributyl phosphate were added to complete the paint.

The gloss of a film of this paint drawn on glass with a doctor blade was 75 at an angle of 60°. The plastic viscosity was 200 centipoises. The flow coefficient was 1.2 indicating very poor flow characteristics, and compares unfavourably with the paints of Examples 3 and 4. As expected, brush marks were evident to an objectionable degree in a film brushed out on primed wood.

EXAMPLES 6–13

Preparation of a series of poly(vinyl alcohol/vinyl ether) thickeners by aqueous emulsion copolymerisation of vinyl acetate with vinyl ethers, followed by drying of the copolymers so-formed and preparation of their aqueous solutions.

The general method of preparation of the thickeners is as follows, the nature and weights of monomers used in each example being as shown in Table 2.

A solution of 7.7 parts of a commercial surfactant ("Abex" 18–S, "Abex" being a registered trademark of Unibasic Incorporated) in 38 parts of distilled water was placed in a flask fitted with a reflux condenser, stirrer, thermometer and two dropping funnels. Nitrogen was passed through the flask for 15 minutes to remove most of the oxygen.

One quarter of the total monomer charge as shown in Table 2 was added to the flask and the temperature raised to 50–55° C., when an addition of 0.18 part of potassium persulphate and 0.9 part of a 2% (w./w.) solution of sodium bisulphite was made. The contents of the flask were then raised gradually to reflux. As polymer "seed" formed the temperature was increased to maintain a gentle reflux until a temperature of 65° C., in the case of the vinyl ethyl ether copolymers, and 70° C. for the other copolymers, was reached. The remainder of the monomer charge and 8.1 parts of a 2% (w./w.) aqueous solution of sodium bisulphite were then added concurrently and slowly at a rate which maintained the reflux temperature at about 65° C. (60° C. for the vinyl ethyl ether copolymers). In most cases the addition took about 4 hours to complete. Heating was continued after the monomer addition was completed to maintain a gentle reflux and ceased when the reflux temperature reached 85° C. (80° C. for the vinyl ethyl ether copolymers). In some preparations the batch failed initially to reach the target temperature at a gentle reflux and in these cases further additions of 0.04 part of potassium persulphate were made until the correct temperature was reached. The copolymers at this stage were in the form of uniform white latices.

Each latex was then placed on a water bath and heated until the polymer was nearly dry. The polymer was dissolved in 400 parts of methanol and 0.8 part of sodium hydroxide were added. The solution was refluxed for 4 hours by which time a fine precipitate of the polymer had formed. A small sample of the mixture was removed and to it was added an equal volume of acetone. The precipitated polymer was filtered, dissolved in water, and dried in the form of a thin film on a poly(tetrafluoroethylene) plate. The infra red spectrum of the free film was examined and the ratio of the peak absorbances at about 1725 cm.$^{-1}$ and about 3300 cm.$^{-1}$ was measured. If this was greater than 0.1 it indicated that significant amounts of acetate groups remained in the polymer. In these cases further additions of 0.8 part of sodium hydroxide were added to the bulk of mixture in methanol, and further samples taken until the adsorbance ratio dropped to below 0.1.

When it was determined in this way that the desired degree of hydrolysis had been achieved, 400 parts of acetone were added to complete the precipitation and flocculation of the polymer, which was recovered by filtration. After drying at room temperature for 16 hours, the polymer was dissolved in water to give a yellow-brown viscous solution. The final solids contents of the solutions are given in Table 2. The solutions prepared as Examples 6–13 will be referred to hereinunder as Thickeners III–X respectively.

TABLE 2

| | Composition of vinyl acetate copolymer | | | Properties of vinyl alcohol copolymers | |
| --- | --- | --- | --- | --- | --- |
| Example | Type of vinyl ether | Parts of vinyl ether | Parts of vinyl acetate | Solids content | Thickener number |
| 6 | Vinyl ethyl ether | 20.5 | 24.6 | 36.5 | III |
| 7 | Vinyl ethyl ether | 11.9 | 33.2 | 33.6 | IV |
| 8 | Vinyl n-butyl ether | 7.7 | 37.4 | 30.9 | V |
| 9 | Vinyl n-butyl ether | 4.1 | 41.0 | 25.2 | VI |
| 10 | Vinyl n-butyl ether | 2.1 | 43.0 | 30.5 | VII |
| 11 | Vinyl iso-butyl ether | 7.7 | 37.4 | 31.9 | VIII |
| 12 | Vinyl iso-butyl ether | 4.1 | 41.0 | 29.0 | IX |
| 13 | Vinyl cyclo-hexyl ether | 3.2 | 41.7 | 29.0 | X |

EXAMPLES 14–28

Preparation of a series of latex paints by the method of the invention and incorporating Thickeners III–X from Examples 6–13.

It will be seen that all of the latex paints so-prepared had very good flow and that Examples 17 and 22 in particular combined the characteristics of good flow with high gloss.

TABLE 3

| | | Preparation of paint | | | Properties of paint | | |
|---|---|---|---|---|---|---|---|
| Example | Thickener solution used (from examples 6–13) | Latex used | Parts of added thickener solution | Additional adjustments | Plastic viscosity in poise (25° C.) | Flow coefficient | Gloss at 60° angle |
| 14 | III | "Primal" AC61 | 1.31 | | 0.52 | 3.8 | 53 |
| 15 | IV | do | 1.44 | | 0.58 | 4.0 | 70 |
| 16 | V | do | 1.56 | Added 3.0 parts water | 1.69 | 6.0 | 61 |
| 17 | V | "Lytron" 680 | 1.56 | Added 1.73 parts water, pH to 8.1 | 2.08 | 8.0 | 79 |
| 18 | V | "Primal" AC35 | 1.56 | pH to 7.3 | 1.32 | 5.1 | 67 |
| 19 | V | "Heteropol" AE320 | 1.56 | Added 1.54 parts water | 1.52 | 4.1 | 68 |
| 20 | VI | "Primal" AC61 | 1.92 | | 1.58 | 5.7 | 67 |
| 21 | VI | "Heteropol" AE320 | 1.92 | | 1.30 | 3.2 | 68 |
| 22 | VI | "Lytron" 680 | 1.92 | Added 0.9 parts water, pH to 8.6 | 0.90 | 5.6 | 82 |
| 23 | VI | "Primal" AC35 | 1.92 | pH to 7.0 | 1.32 | 4.2 | 68 |
| 24 | VII | "Primal" AC61 | 1.58 | | 1.06 | 4.2 | 71 |
| 25 | VIII | do | 0.87 | Added 6.0 parts of propylene glycol | 1.44 | 7.1 | 40 |
| 26 | VIII | "Primal" AC35 | 1.52 | pH to 8.6 | 1.30 | 4.2 | 71 |
| 27 | IX | "Primal" AC61 | 1.66 | Added 1.09 parts water | 1.21 | 5.0 | 62 |
| 28 | X | do | 1.66 | | 1.35 | 7.3 | 64 |

Each paint was prepared from a common mill-base made according to the following formula:

A mixture of

| | Parts |
|---|---|
| Pigment grade titanium dioxide ("Austiox" R–CR6, "Austiox" being a registered trademark of Australian Titan Products Pty. Ltd.) | 10.0 |
| Commercial defoamer ("Nopco" NXZ, "Nopco" being a registered trademark of Nopco Chemical Co.) | 0.08 |
| 25% (w./v.) aqueous solution of sodium hexametaphosphate | 0.24 |
| Water | 2.7 | was ground for 16 hours in a laboratory ball mill.

The mill-base so-prepared was added with stirring to 26.0 parts of the latex under test. The particular latex used in each example is shown in Table 3 and are identified as follows:

"Primal" AC61 and AC35.—Acrylic latices, "Primal" being a registered trademark of Primal Chemicals Pty. Ltd.

"Lytron" 680.—An acrylic copolymer latex, "Lytron" being a registered trademark of Monsanto Chemical Co.

"Heteropol" A.E. 320.—An acrylic latex. "Heteropol" is a registered trademark of Polymer Corporation Ltd.

Thickeners according to Table 3 were added to the above mixtures with stirring, the thickeners being warmed if necessary to increase their fluidity for ease of handling.

To achieve preferred brushing rheologies further adjustments to some of the paints were made. The viscosity of the paints prepared in Examples 16, 17, 19, 22 and 27 were adjusted by the addition of the quantities of water indicated in Table 3. The pH of each paint in Examples 17, 18, 22, 23 and 26 was adjusted to the values given in Table 3 using a 20% aqueous solution of formaldehyde. An addition of 6.0 parts of propylene gylcol was made to the paint in Example 25.

The rheology of each of the paints of Examples 14–28 was measured at 25° C. on an "Epprecht" Rheomat "15" using the "B" cup. The plastic viscosities and flow coefficients, as hereinabove defined were determined and as recorded in Table 3. The flow coefficients are all above 3 indicating that the paints have good flow. This was confirmed when the paints were brushed onto glass panels, with the brush marks flowing out to a degree uncommon in conventional latex paints.

The gloss values of the paints brushed onto glass were measured at an angle of 60° according to A.S.T.M. Specification D–523. The films were allowed to dry for a least 16 hours before gloss measurements were made. The results are given in Table 3.

EXAMPLE 29

This example illustrates the preparation of an aqueous latex paint incorporating an acrylic latex of small particle size and a polyvinyl alcohol thickener containing no ether groups. This thickener lies outside the compositions of our invention, and the final paint has very poor flow characteristics.

The paint was prepared by the method described in Examples 14–28. The mill-base consisted of 10 parts of "Austiox" R–CR3, 0.1 part of "Nopco NXZ, 0.3 part of 25% (w./v.) aqueous sodium hexametaphosphate solution, and 0.5 part of "Gelvatol" 1–90 in 7.2 parts of distilled water. Twenty seven parts of "Primal" AC61, plasticised with 5% (based on the latex solids) of tributyl phosphate, were added to complete the paint. "Gelvatol" (registered trade mark of Shawinigan Chemicals Corporation) 1–90 is a poly(vinyl alcohol) containing about 1% of unhydrolysed residual poly(vinyl acetate).

The gloss of a film of this paint drawn on glass with a doctor blade was 75 at an angle of 60°. The plastic viscosity was 51 centipoises and the flow coefficient was 0.3, indicating very poor flow characteristics. When the paint was brushed out on primed wood, brush marks were very noticeable.

We claim:

1. A coating composition comprising in combination:
   (a) a separately prepared latex vehicle comprising water, 0 to 30% by weight of water miscible organic liquids, 0 to 4% by weight of surface active agents and 20 to 60% by weight of dispersed resinous particles having an average particle size between 0.01 micron and 3.0 microns, based on the total weight of liquid latex vehicle; and
   (b) from 0.1 to 10.0% by weight based on the weight of resinous particles of a separately prepared thickening agent soluble in the continuous phase of the latex the thickening agent consisting of a derivative of poly(vinyl alcohol) having a molecular weight between 10,000 and 600,000, hydroxyl groups of the poly(vinyl alcohol) being substituted by ether groups of the formula

—OR each of the ether groups replacing a hydroxyl group and where R, which may be the same or different within the molecule, contains 2 to 7 carbon atoms and is selected from the group consisting of alkyl, alkenyl, alkoxy-alkyl, alkoxy-alkenyl, aryl, alk-aryl, ar-alkyl, ar-alkoxyl groups and derivatives of any one of the above groups in which at least one hydrogen atom has been replaced by a chlorine atoms, the degree of substitution of the hydroxyl groups of the poly(vinyl alcohol) in the derivative expressed as a percentage of the total hydroxyl groups being determined according to the following table:

| Number of carbon atoms in R | Percentage substitution | |
|---|---|---|
| | Lower limit | Upper limit |
| 2 | 10 | 50 |
| 3 | 6 | 30 |
| 4 | 3 | 20 |
| 6-7 | 1 | 15 | the amount of said thickener in the coating composition being such that said composition has a plastic viscosity of 5 to 500 centipoises and a flow coefficient above 3.0.

2. A coating composition according to claim 1 in which the dispersed resinous particles have an average particle size between 0.1 micron and 1.0 micron.

3. A coating composition according to claim 1 in which the poly(vinyl alcohol) derivatives have a molecular weight between 20,000 and 200,000.

4. A coating composition according to claim 1 in which R is a member selected from the group consisting of ethyl, n-propyl, iso-propyl, n-butyl, iso-butyl, secondary-butyl, tertiary-butyl, 2-chloro ethyl, 2-methoxy ethanol, cyclohexyl and benzyl groups.

5. A coating composition according to claim 1 in which R is a member selected from the group consisting of a butyl group and a propyl group.

6. A coating composition according to claim 5 wherein the degree of substitution of the hydroxyl groups of the poly(vinyl alcohol) in the derivative expressed as a percentage of the total hydroxyl groups, is determined according to the following table:

| Number of carbon atoms in R | Percent substitution |
|---|---|
| 2 | 15-30 |
| 3 | 8-20 |
| 4 | 5-10 |
| 6-7 | 2-8 |

7. A coating composition according to claim 1 in which the disperse polymer particles are polymers of at least one monomer selected from the group consisting of vinyl ester, vinyl ether, alkyl acrylate, alkyl methacrylate, alkyl fumarate, alkyl maleate, halogenated vinyl, aryl vinyl and olefin monomers.

8. A coating composition according to claim 7 in which the disperse polymer particles are polymers of vinyl acetate monomer in the major molar proportion with at least one monomer selected from the group consisting of vinyl caprate, 2-ethyl hexyl acrylate, ethyl acrylate, n-butyl methacrylate, di-butyl maleate and di-butyl fumarate in the minor proportion.

9. A coating composition according to claim 7 in which the disperse polymer particles are copolymers of methyl methacrylate monomer with at least one monomer selected from the group consisting of ethyl acrylate, butyl acrylate, butyl methacrylate and 2-ethyl hexyl acrylate.

References Cited

UNITED STATES PATENTS 2,998,400   8/1961   French _____ 260—29.6WA

FOREIGN PATENTS 475,162   11/1937   Great Britain ____ 260—29.6WA

MURRAY TILLMAN, Primary Examiner

H. ROBERTS, Assistant Examiner

U.S. Cl. X.R.

117—148, 161; 260—29.7, 30.1, 31.6, 32.8, 33.2, 33.4, 41, 41.5, 45.75, 45.95, 71.3, 874, 887, 897, 901